(12) United States Patent
Miyakoshi et al.

(10) Patent No.: US 12,222,710 B2
(45) Date of Patent: Feb. 11, 2025

(54) CONTROL APPARATUS AND CONTROL SYSTEM

(71) Applicant: MAZDA MOTOR CORPORATION, Hiroshima (JP)

(72) Inventors: Minoru Miyakoshi, Hiroshima (JP); Chitoshi Morishige, Hiroshima (JP); Yasuhide Yano, Hiroshima (JP); Tomohoko Adachi, Hiroshima (JP); Seiya Fujii, Higashihiroshima (JP); Shin Wakitani, Higashihiroshima (JP); Nobutaka Wada, Higashihiroshima (JP); Toru Yamamoto, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 478 days.

(21) Appl. No.: 17/578,146

(22) Filed: Jan. 18, 2022

(65) Prior Publication Data

US 2022/0229427 A1 Jul. 21, 2022

(30) Foreign Application Priority Data

Jan. 19, 2021 (JP) .................................. 2021-006569

(51) Int. Cl.
G05B 19/418 (2006.01)

(52) U.S. Cl.
CPC . *G05B 19/41885* (2013.01); *G05B 19/41875* (2013.01); *G05B 2219/23005* (2013.01); *G05B 2219/24128* (2013.01)

(58) Field of Classification Search
CPC ........ G05B 19/41885; G05B 19/41875; G05B 2219/23005; G05B 2219/24128;
(Continued)

(56) References Cited

U.S. PATENT DOCUMENTS

2015/0275796 A1 10/2015 Pochner et al.
2019/0061872 A1* 2/2019 Jackson ............... B60K 17/043
(Continued)

FOREIGN PATENT DOCUMENTS

JP H04-313195 A 11/1992
JP 2002-259505 A 9/2002
(Continued)

OTHER PUBLICATIONS

Toru Yamamoto et al. "New Design Approach on Smart Model-Based Development (S-MBD) based on Control Engineering", A New Development Platform, Technical Meeting on Electronic/Information/System Control, Jun. 29, 2019, CT19099, pp. 25-26.

*Primary Examiner* — Thomas C Lee
*Assistant Examiner* — Michael Tang
(74) *Attorney, Agent, or Firm* — Studebaker & Brackett PC

(57) ABSTRACT

To keep plant performance constant in a control apparatus for controlling a plant including a plurality of units. The control apparatus (a PCM) controls an automobile including a plurality of units. The control apparatus includes a model controller that generates a target value of a characteristic to be achieved by each unit based on a model set for each unit, a unit specifier (a performance change determinator) that specifies a unit in which performance unique to the unit has changed among the units, and a target value corrector (an FF updater) that corrects the target value for the unit that has been specified by the unit specifier.

10 Claims, 12 Drawing Sheets

(58) Field of Classification Search
CPC ..... G05B 13/048; G05B 17/02; B60W 10/06; B60W 10/08; B60W 10/184; B60W 10/20; B60W 2050/0088; B60W 50/0098; B60W 2050/0037; B60W 2050/0039; B60W 50/00; B60W 20/10
USPC .......................................................... 700/29
See application file for complete search history.

(56) References Cited

U.S. PATENT DOCUMENTS

| | | | |
|---|---|---|---|
| 2019/0154045 A1* | 5/2019 | Fessel | F04D 25/06 |
| 2020/0293009 A1 | 9/2020 | Quirynen et al. | |
| 2022/0170679 A1* | 6/2022 | Fujimoto | F25B 40/02 |
| 2022/0185321 A1* | 6/2022 | Bora | B60W 40/105 |
| 2022/0261021 A1* | 8/2022 | Rollins | F04D 25/0606 |

FOREIGN PATENT DOCUMENTS

| | | | |
|---|---|---|---|
| JP | 2011-210215 A | | 10/2011 |
| JP | 2015-048975 A | | 3/2015 |
| JP | 2015072613 A | * | 4/2015 |

* cited by examiner

CONTROL APPARATUS AND CONTROL SYSTEM

CROSS-REFERENCE TO RELATED APPLICATION

This application claims priority to Japanese Patent Application No. 2021-006569 filed on Jan. 19, 2021, the entire disclosure of which is incorporated by reference herein.

BACKGROUND

The present disclosure relates to a control apparatus for controlling a plant including a plurality of units and a control system including a plurality of plants.

For example, Toru Yamamoto, "Smart MBD (S-MBD) Technique based on Control Engineering Perspective—Proposal of New Development Platform—," Journal C of the Institute of Electrical Engineers, Technical Meeting on Electronic/Information/System Control, Jun. 29, 2019, CT19099, pp. 25-26 discloses a development method in which a database-driven (DD) control system design method is combined with so-called model based development (MBD). Specifically, the document discloses, as an example of a design method for achieving desired performance of a system, a method of adjusting an adjustable parameter of a modeled system by a database mechanism.

SUMMARY

The inventors of the present application have considered that a design method based on a model as described in the above document is applied to general system control and a system including a plurality of units (e.g., an engine and a motor), such as a hybrid system or a steering system of an automobile, is operated as a control target (a plant).

It is assumed that the performance of such a plant changes due to aging and other causes as the plant is operated for a long period of time. For keeping the plant performance constant, the inventors of the present application have searched a mechanism for autonomously compensating for the changed performance by correcting the configuration of a model corresponding to the plant or an output value of the model as necessary. The inventors of the present application have focused on the fact that each plant includes the units, and have arrived at the present disclosure.

The present disclosure has been made in view of the above-described points, and an object thereof is to keep plant performance constant in a control apparatus for controlling a plant including a plurality of units.

Specifically, a first aspect of the present disclosure relates to a control apparatus for controlling a plant including a plurality of units. The control apparatus includes a model controller that generates a target value of a characteristic to be achieved by each unit based on a model set for each unit, a unit specifier that specifies a unit in which performance unique to the unit has changed among the units, and a target value corrector that corrects the target value for the unit that has been specified by the unit specifier.

According to the first aspect, the target value corrector performs correction of the target value for the unit specified by the unit specifier, i.e., the unit determined that the performance unique to the unit has changed, among the units. Accordingly, the performance of the plant is autonomously compensated, and can be kept constant. Moreover, by performing compensation for each unit instead of performing compensation for each plant, performance compensation can be achieved while a change in the control forms of other units is reduced as much as possible.

According to a second aspect of the present disclosure, the control apparatus may include a plurality of characteristic estimators that corresponds to the respective units and estimates the characteristic achieved by each unit, and a plant behavior estimator that estimates plant output of the plant based on the characteristic that has been estimated by each characteristic estimator. The target value corrector may correct the target value such that desired plant output is achieved.

Here, the term "plant output" refers to general plant output such as a vehicle speed in a case where an automobile is used as the plant.

According to the second aspect, the target value corrector corrects the target value of the characteristic to be achieved by the unit such that the desired plant output is achieved through correction of the target value. In this manner, by adjusting the plant output through compensation for each unit, adjustment of the plant output can be achieved while a change in the control forms of other units is reduced.

According to a third aspect of the present disclosure, the units may include a first unit contributing to an increase or decrease in predetermined plant output and a second unit contributing to an increase or decrease in the plant output common to the first unit. In a case where the unit specifier determines that the performance of one of the first unit or the second unit has changed, the model controller may increase or decrease the target value associated with the other one of the first unit or the second unit to compensate for the change.

According to the third aspect, in a case where the performance of the first unit has, for example, irreversibly greatly changed, the desired plant output can be achieved by an increase or decrease in the target value of the second unit. In this manner, other units autonomously recover a change in the performance, which is advantageous in keeping the plant performance constant.

According to a fourth aspect of the present disclosure, the target value corrector may correct the target value by correcting the model corresponding to the unit that has been specified by the unit specifier.

According to the fourth aspect, the model corresponding to the unit whose performance has changed is corrected, which is advantageous in compensating for a change in the performance of the unit and therefore keeping the plant performance constant.

According to a fifth aspect of the present disclosure, the control apparatus may further include a plurality of feedback sections that corresponds to the respective units. Each feedback section may generate, based on an output signal from the unit corresponding to the each feedback section, a feedback signal for correcting an output signal from the model controller to compensate for a difference between a characteristic actually achieved by the unit and the target value. Each feedback section may correct the output signal by adjusting an FB characteristic amount indicating any one of the feedback signal or an FB parameter indicating a coefficient contributing to an increase or decrease in the feedback signal based on the output signal from the unit.

According to the fifth aspect, feed forward control based on the model and feedback control are combined. This is advantageous in keeping the plant performance constant.

According to a sixth aspect of the present disclosure, each feedback section may input the FB characteristic amount to the unit specifier. Based on a change in the FB characteristic amount in each unit, the unit specifier may determine a change in the performance unique to the unit. The target value corrector may correct the model based on a change in the FB characteristic amount in each unit.

According to the sixth aspect, the model is corrected based on a change in the FB characteristic amount. This is advantageous in keeping the plant performance constant.

According to a seventh aspect of the present disclosure, the target value corrector may correct the target value through adjustment of the FB characteristic amount in a case where the moving average of the FB characteristic amount is less than a predetermined threshold, and may correct the target value through correction of the model in a case where the moving average of the FB characteristic amount is equal to or greater than the predetermined threshold.

According to the seventh aspect, for a change with a relatively-small change amount in a temporal performance change or an irreversible performance change, the target value is corrected by the feedback control. On the other hand, for a change with a relatively-great change amount in the irreversible performance change, the target value is corrected through correction of the model. In this manner, by selectively using these two correction methods, more flexible control is achieved, which is advantageous in keeping the plant performance constant.

According to an eighth aspect of the present disclosure, the control apparatus may further include a measurer that detects a measurement signal indicating operation environment of the plant. The unit specifier may determine a change in the performance unique to the unit based on the measurement signal of the measurer and the FB characteristic amount.

According to the eighth aspect, such control that a change in the performance of the unit is associated with the operation environment of the plant can be achieved. Accordingly, the performance of each unit can be more properly compensated.

According to a ninth aspect of the present disclosure, the control apparatus may further include a map generator that stores the operation environment of the plant, the FB characteristic amount, and an FF parameter as a parameter characterizing the model in association with each other. The target value corrector may collate the FF parameter corresponding to the FB characteristic amount based on the signal detected by the measurer and the FB characteristic amount.

According to the ninth aspect, such control that a change in the performance of the unit, the operation environment of the plant, and information associated with correction of the model are associated with each other can be achieved. Accordingly, the performance of each unit can be more properly compensated.

According to a tenth aspect of the present disclosure, the map generator may update, during drive of the plant, a relationship among the drive environment of the plant, the FB characteristic amount, and the FF parameter in real time.

According to the tenth aspect, such knowledge that a change in the performance of the unit, the operation environment of the plant, and the information associated with correction of the model are associated with each other can be obtained. This contributes to autonomous updating for the plant.

According to an eleventh aspect of the present disclosure, in a case where the unit specifier specifies a plurality of units, the timing of reflecting correction of the target value may be adjusted to the substantially identical timing among the units.

According to the eleventh aspect, the identical timing of correcting the target value is set to the extent possible, which is advantageous in reducing occurrence of unintended plant output and therefore keeping the plant performance constant.

According to a twelfth aspect of the present disclosure, the plant may be an automobile, and the units may include one or more of an engine and a motor that output torque for driving the automobile, a brake unit that puts a brake on the automobile, or a steering system that steers the automobile.

A thirteenth aspect of the present disclosure relates to a control system including a plurality of plants controlled by the respective control apparatuses. In the control system, each plant may include the units, and a specifying result of the unit specifier in any one of the plants may be shared among other plants.

According to the thirteenth aspect, information associated with a change in the performance of the unit can be shared among the plants. As described above, the knowledge obtained by the unit specifier is shared among the plants, and therefore, more autonomous control can be achieved.

According to a fourteenth aspect of the present disclosure, at least some of the control apparatuses may be mounted on an external server, and the plants may communicate with each other via the external server.

According to the fourteenth aspect, the information associated with a change in the performance of the unit can be exchanged among the plants via the external server. As described above, the knowledge obtained by the unit specifier is shared among the plants, and therefore, more autonomous control can be achieved.

As described above, according to the present disclosure, the plant performance can be kept constant in the control apparatus for controlling the plant including the units.

DESCRIPTION OF EMBODIMENTS

Hereinafter, embodiments of the present disclosure will be described. Note that the following description is merely illustrative.

That is, in the present specification, an automobile including an engine, a motor, and other components will be described as one example of a plant including a plurality of units, but the technique disclosed herein is not limited to application to the automobile. The present disclosure can be generally applied to a mechanical system including a plurality of units.

In particular, in the present specification, an engine, a motor, a brake, and a steering unit for driving an automobile will be described as examples of the units included in the plant. However, the units according to the present disclosure include general units associated with operation of the plant. Elements other than mechanical units, such as a driver of the automobile, can also be taken as units.

In addition, in the present specification, a PCM mounted on the automobile will be described as one example of a control apparatus of the plant, but the control apparatus according to the present disclosure is not limited to a module mounted on the plant. The control apparatus according to the present disclosure includes general equipment that can be connected to the plant in a wired or wireless manner, such as an external server. As in variations described later, part of the control apparatus may be implemented by the PCM, and the other part of the control apparatus may be implemented by the external server.

<Entire Configuration>

Figure 1:
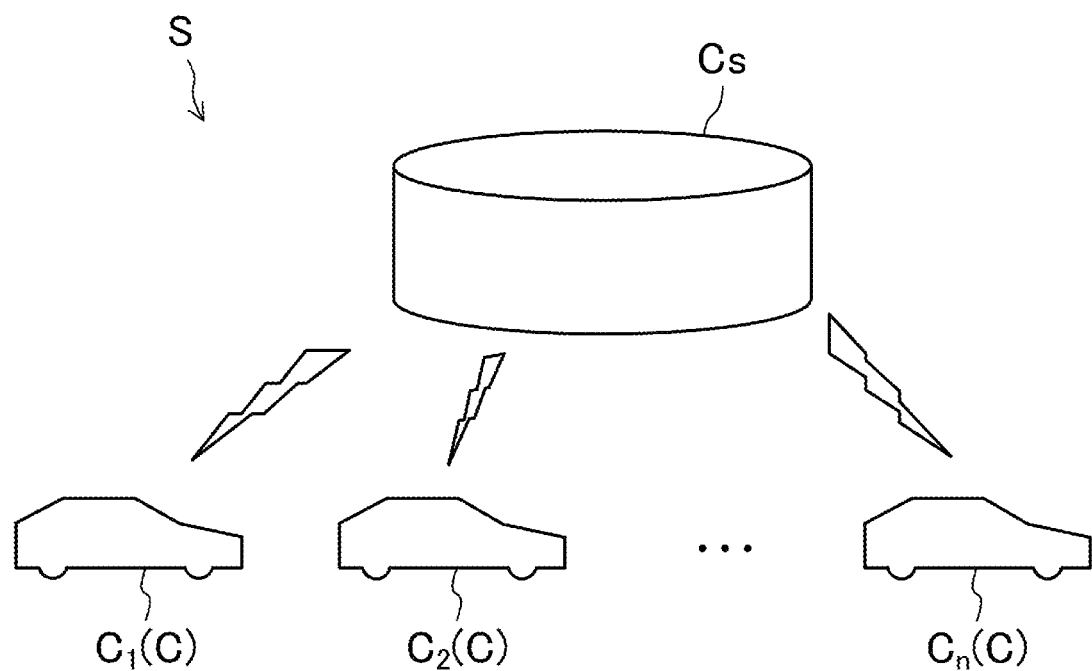
FIG. 1 is a diagram showing, as an example, an entire configuration of a control system.
Figure 2:
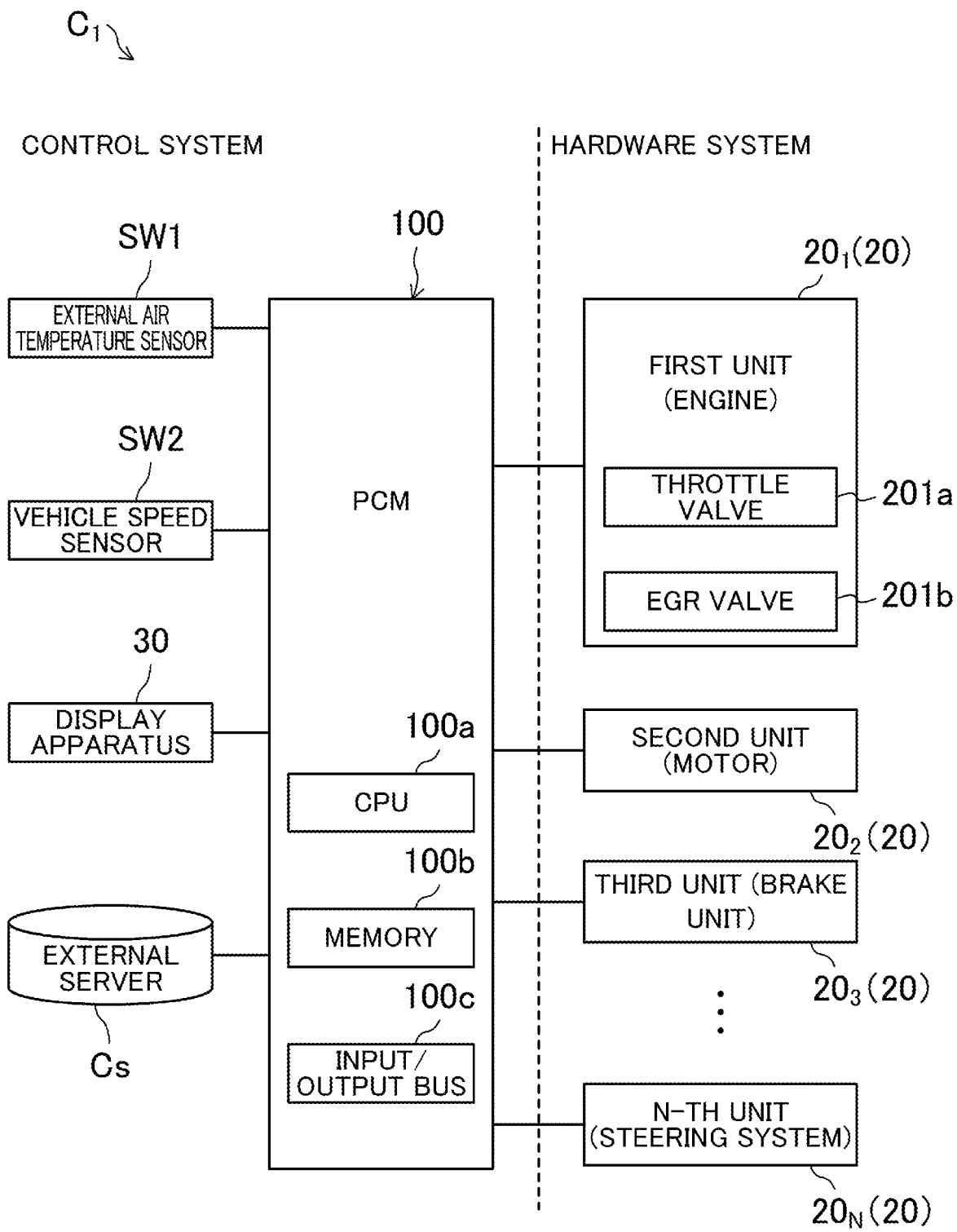
FIG. 2 is a diagram showing, as an example, the configuration of each plant in the control system.

FIG. 1 is a diagram showing, as an example, an entire configuration of a control system S. Moreover, FIG. 2 is a diagram showing, as an example, the configuration of each plant (each automobile C) in the control system S. As shown in FIG. 1, the control system S according to the present embodiment includes a plurality (n in the illustrated example) of automobiles $C_1$ to $C_n$. Each of the automobiles $C_1$ to $C_n$ indicates, as an example, the "plant" in the present embodiment. Unless otherwise limited to a particular automobile, an automobile will be hereinafter also simply referred to as an "automobile C."

The automobiles $C_1$ to $C_n$ are connected to each other via an external server Cs. One automobile C sends or receives an electrical signal to or from the other automobiles C via the external server Cs. Note that the external server Cs is not essential. It may be configured such that the automobiles C communicate with each other without the external server Cs.

As shown in FIG. 2, each automobile C includes a plurality (N in the illustrated example) of units $20_1$ to $20_N$. Specifically, each automobile C includes a first unit $20_1$ having an engine, a second unit $20_2$ having a motor, a third unit $20_3$ having a brake unit, an N-th unit $20_N$ having a steering system, and other units $20_4$ to $20_{N-1}$. Each of the first unit $20_1$ having the engine and the second unit $20_2$ having the motor outputs torque for driving the automobile C. The third unit 203 having the brake unit puts a brake on the automobile C. The N-th unit 20N having the steering system steers the automobile C. Each of the first unit $20_1$ to the N-th unit $20_N$ indicates, as an example, a "unit" in the present embodiment. Unless otherwise limited to a particular unit, a unit will be hereinafter also simply referred to as a "unit 20." These units 20 form a hardware system of the automobile C.

Each unit 20 is selected from elements capable of controlling the behavior of the automobile C. Note that the behavior of the automobile C described herein includes any index associated with the dynamic behavior of the automobile C.

Generally, "plant behavior" indicates an output value, i.e., a general plant output, controlled by a PCM 100. As described later, in a case where model prediction control is performed by the PCM 100, the behavior of the plant is equivalent to a plant output controlled to follow a predetermined set value trajectory. Hereinafter, the "behavior of the plant" and the "behavior of the automobile C" will be also referred to as "plant output."

For example, the behavior of the automobile C in the present embodiment includes physical quantities associated with the unit according to the present disclosure among any physical quantities characterizing motion of the automobile C, such as the longitudinal speed, the lateral speed, the longitudinal acceleration, the lateral acceleration, and the yaw rate of the automobile C. Note that "longitudinal" in the present specification is equal to propulsion and reverse running directions of the automobile C. Similarly, "lateral" in the present specification is equal to a right-left turning direction of the automobile C.

More specifically, as described above, in a case where the engine, the motor, and the brake unit of the automobile C are taken as the units, the behavior of the automobile C may include physical quantities associated with propulsion of the automobile C, such as the longitudinal speed and the longitudinal acceleration. On the other hand, in a case where the units include the steering system, the behavior of the automobile C may include physical quantities associated with steering of the automobile C, such as the yaw rate.

Each unit 20 may have a plurality of sub-units. The sub-unit described herein is selected from elements capable of controlling the behavior of the corresponding unit 20. In the example shown in FIG. 2, the first unit $20_1$ has, as the sub-units, devices associated with operation of the engine. Specifically, the first unit $20_1$ has, as the sub-units, a throttle valve 201a and an EGR valve 201b. Although not shown, the second unit $20_2$ may have, as devices associated with drive of the motor, an inverter, a DC/DC converter, and other components as the sub-units. According to the present disclosure, the sub-units of the unit 20 may be also indirectly controlled via control of the unit 20.

As an element for controlling the automobile C as the plant, the PCM 100 as the control apparatus is mounted on each automobile C. The PCM 100 includes a CPU 100a that executes various types of arithmetic operation, a memory 100b that at least temporarily stores information necessary for the arithmetic operation performed by the CPU 100a, and an input/output bus 100c that forms a path for data transmission/reception. The PCM 100 is connected to the above-described external server Cs such that an electrical signal is transmittable to or receivable from the external server Cs. In other words, the automobile C is connected to the external server Cs via the PCM 100 that controls the automobile C.

Sensors for detecting measurement signals associated with drive environment (operation environment) of the automobile C are wirelessly connected to the PCM 100 as the control apparatus. More specifically, a sensor not physically connected to each unit 20 is connected to the PCM 100 according to the present embodiment. That is, as the sensors according to the present embodiment, a sensor (a so-called external sensor) attachable to the outside of the unit 20, such as a GPS sensor, may be selected in addition to a sensor, such as a crank angle sensor and a cylinder pressure sensor, physically directly attached to the unit 20 (e.g., an engine).

Such external sensors are configured to detect measurement signals associated with information (drive conditions) characterizing environment where the automobile C is located, such as an air pressure, a temperature, and an altitude, rather than information associated with the dynamic behavior of the automobile C, such as the speed and acceleration of the automobile C.

Specifically, the PCM 100 according to the present embodiment is connected to an external air temperature sensor SW1 as an external sensor (a measurer) that detects a measurement signal indicating the operation environment of the plant and a vehicle speed sensor SW2 as a non-external sensor. These sensors SW1 to SW2 and the PCM 100 together form the control system of the automobile C.

Moreover, a display apparatus 30 for displaying various types of information is connected to the PCM 100 in a wired or wireless manner. The display apparatus 30 may be configured using a liquid crystal display or an organic EL display, for example.

Figure 3:
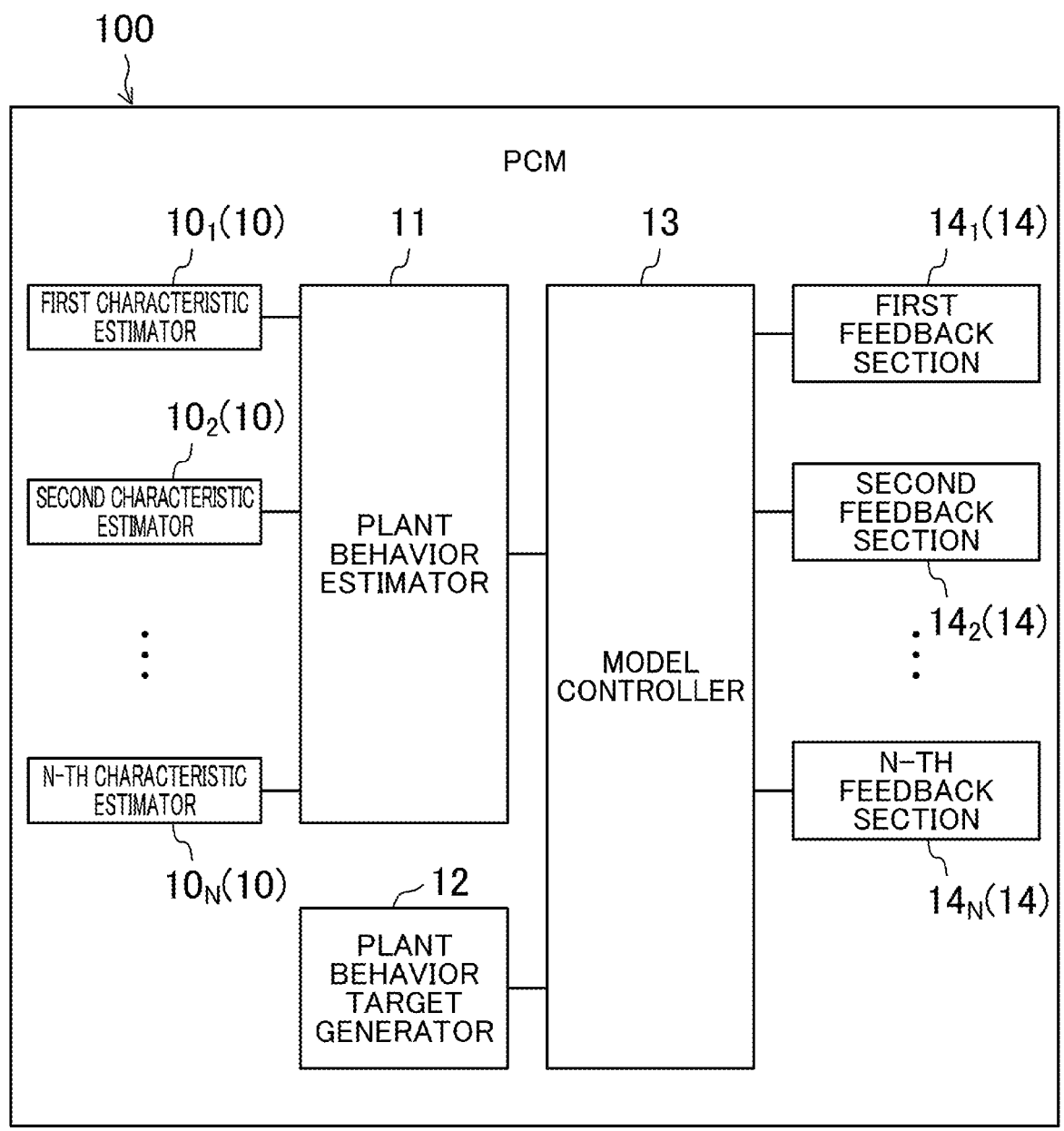
FIG. 3 is a diagram showing, as an example, the configuration of a control apparatus of each plant.
Figure 4:
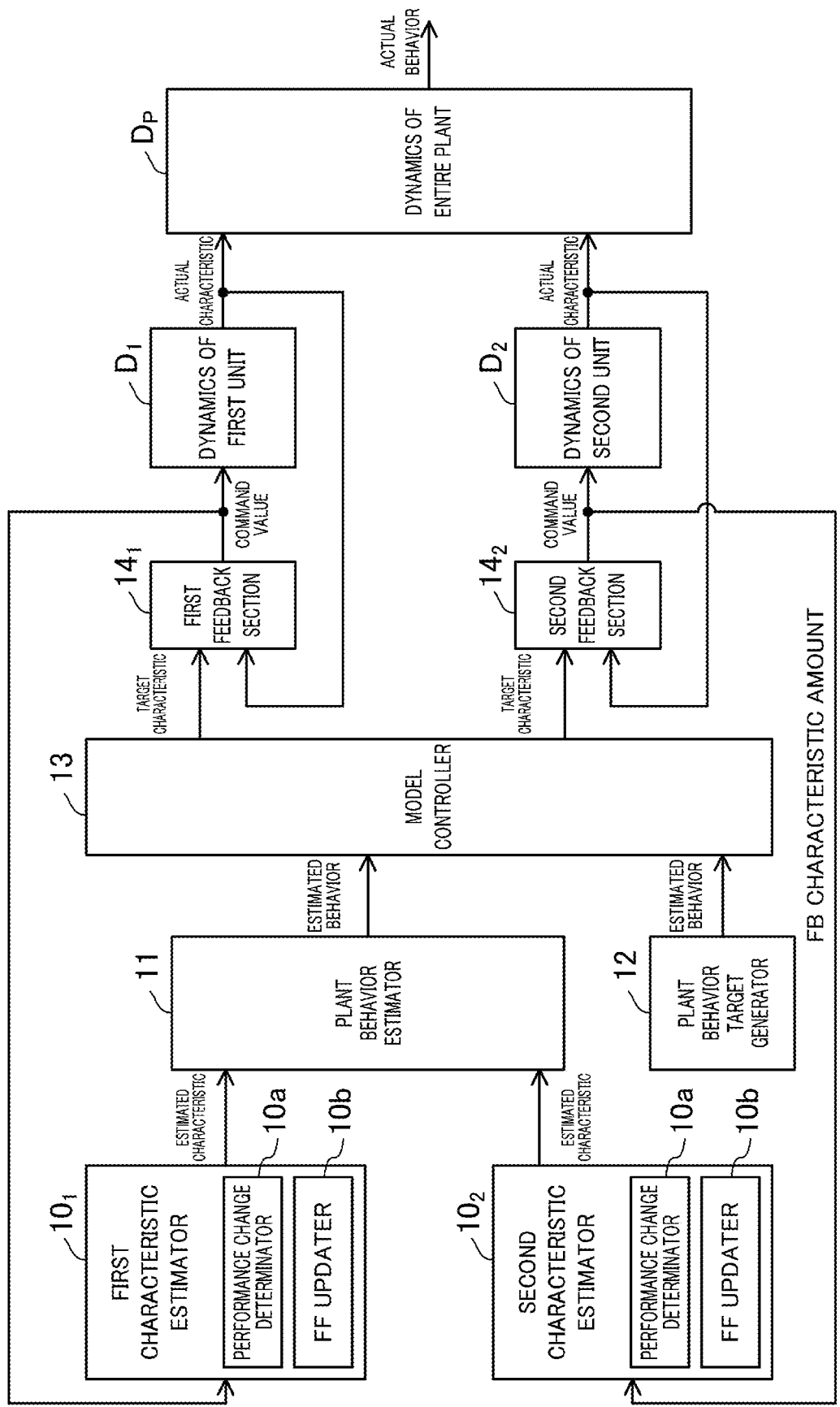
FIG. 4 is a diagram for describing control of the plant by the control apparatus.

FIG. 3 is a diagram showing the configuration of the control apparatus (the PCM 100) of each plant (the automobile C). Moreover, FIG. 4 is a diagram for describing control of the plant (the automobile C) by the control apparatus (the PCM 100). FIG. 4 shows a relationship between a connection relationship among functional blocks shown as examples in FIG. 3 and the dynamic behavior (dynamics) of the plant and the units. Hereinafter, the outline of each function implemented in the PCM 100 will be described with reference to FIGS. 3 and 4.

As shown in FIG. 3, the PCM 100 according to the present embodiment includes a first characteristic estimator $10_1$ to an N-th characteristic estimator $10_N$, a plant behavior estimator 11, a plant behavior target generator 12, a model controller 13, and a first feedback section $14_1$ to an N-th feedback section 14N. These functional blocks are implemented by predetermined programs (e.g., pre-coded programs or programs input to function as an interpreter), and are read to the memory 100b as necessary. Of these functional blocks, the first characteristic estimator $10_1$ to the N-th characteristic estimator $10_N$ and the first feedback section $14_1$ to the N-th feedback section $14_N$ are both mounted so as to be the same number as that of the units 20. The program corresponding to each functional block may be updated automatically or manually after the start of operation of the plant (the automobile C).

Hereinafter, the basic concept of processing implemented by each functional block will be described.
<Basic Concept>

Among the functional blocks described above, the first characteristic estimator $10_1$ to the N-th characteristic estimator $10_N$ determine performance (hereinafter referred to as "unit performance") unique to each unit 20, and set a model characterizing the characteristics (hereinafter referred to as a "unit characteristic") of each of the first unit $20_1$ to the N-th unit $20_N$ based on the determined unit performance Hereinafter, the "first characteristic estimator $10_1$" to the "N-th characteristic estimator $10_N$" may be collectively referred to as a "characteristic estimator 10."

The first characteristic estimator $10_1$ to the N-th characteristic estimator $10_N$ estimate the unit characteristic to be achieved by the unit 20 corresponding to each characteristic estimator based on the set model. The first characteristic estimator $10_1$ to the N-th characteristic estimator $10_N$ input estimation results to the plant behavior estimator 11. Hereinafter, the estimated unit characteristic will be also referred to as an "estimated characteristic."

Specifically, the model set by the characteristic estimator 10 is configured to output the unit characteristic according to the unit performance. The "unit characteristic" as described herein refers to a physical quantity contributing to an increase or decrease in the plant output. In other words, the unit characteristic of the present disclosure includes general characteristics contributing to an increase or decrease in the plant output.

For example, in a case where the engine, the motor, and the brake unit are used as the units 20 and the longitudinal acceleration or longitudinal speed of the automobile C is used as the plant output, e.g., engine torque, motor torque, and brake torque can be used as the unit characteristics corresponding to these settings.

Similarly, in a case where the steering unit and the brake unit are used as the units 20 and the yaw rate of the automobile C is used as the plant output, e.g., the position of a steering rack in the steering unit and the brake torque can be used as the unit characteristics corresponding to these settings.

The plant according to the present embodiment includes the units 20. These units 20 may include the first unit $20_1$ contributing to an increase or decrease in predetermined plant output, and the second unit $20_2$ contributing to an increase or decrease in plant output common to the first unit $20_1$. In the example described above, in a case where the plant output is set to the longitudinal acceleration or longitudinal speed of the automobile C, each of the first and second units $20_1$, $20_2$ corresponds to an optional combination of the engine, the motor, and the brake unit. Similarly, in a case where the plant output is set to the yaw rate of the automobile C, the first and second units $20_1$, $20_2$ respectively correspond to the steering unit and the brake unit.

The unit performance determined by the characteristic estimator 10 includes performance contributing to an increase or decrease in the unit characteristic such as the engine torque and therefore a general coefficient obtained by parameterizing such performance.

For example, in a case where the engine torque is used as the unit characteristic, e.g., a tire radius, a gear ratio, a vehicle body weight, an air resistance, a gradient resistance, a brake pad resistance (the friction resistance of a brake pad), a hub resistance (the friction resistance of a hub), and the inertia moment of a tire can be used as the unit performance corresponding to such a unit characteristic. The characteristic estimator 10 sets such a model that the acceleration of the engine is taken as input and the engine torque is taken as output, using such unit performance as a parameter.

The characteristic estimator 10 determines a change in the unit performance as described above. The characteristic estimator 10 can correct the model (hereinafter also referred to as a "unit model") based on a determination result of a change in the unit performance to compensate for such a change.

The characteristic estimator 10 includes, as functional blocks for implementing determination of the unit performance and correction of the model, a performance change determinator (a unit specifier) 10a and an FF updater (a target value corrector) 10b. For example, the FF updater 10b specifies the unit 20 whose unit performance has changed among the units 20 based on a later-described FB characteristic amount input from the corresponding feedback section 14. For example, the FF updater 10b corrects the unit model corresponding to the unit 20 specified by the performance change determinator 10a, thereby correcting a later-described target value (a target characteristic) output from the model controller 13. Details of these functional blocks will be described later.

The plant behavior estimator 11 estimates behavior achieved by the plant (the automobile C) based on the estimated characteristics output from the first characteristic estimator $10_1$ to the N-th characteristic estimator $10_N$. The plant behavior estimator 11 inputs such an estimation result to the model controller 13.

As described above, the plant output closely relates to the unit characteristic of each unit 20. The plant output can be modeled as a function using the unit characteristic of each unit 20 as input. The function (hereinafter also referred to as a "plant model") obtained by modeling of the plant output is, as necessary, read from, e.g., the memory 100*b*, and used, by the plant behavior estimator 11 and the model controller 13.

For example, in a case where the engine torque and the motor torque are used as the unit characteristics, the longitudinal acceleration or longitudinal speed of the automobile C can be used as the plant output corresponding to the engine torque and the motor torque, as described above. In this case, the plant output can be described by a model in which a coupling structure from a power train including the engine and the motor to the tire (particularly a driving wheel) is formulated and an additional value of the engine torque and the motor torque is used as an input.

That is, the characteristic estimator 10 and the plant behavior estimator 11 can be regarded as a modeled relationship between the unit characteristic and the plant output. By tracing back this relationship, the unit characteristic (a target value of the characteristic to be achieved by each unit) corresponding to desired plant output and therefore the model setting for achieving the unit characteristic can be autonomously corrected.

The plant behavior target generator 12 generates a target value of the behavior to be achieved by the automobile C as the plant. As described later, in a case where the model controller 13 performs the model prediction control, the target value is equivalent to the so-called set value trajectory. In a case where the longitudinal acceleration of the automobile C is used as the plant output, the plant behavior target generator 12 generates a target value of the longitudinal acceleration (specifically, a longitudinal acceleration to be achieved in the future). Such generation of the target value can be performed based on a measurement signal associated with an interface for driving the automobile C, such as the accelerator position of the automobile C. For example, in a case where the yaw rate of the automobile C is used as the plant output, generation of a target value associated therewith can be performed based on the rotation angle of a steering wheel.

The model controller 13 generates a target value of the characteristic (the unit characteristic) to be achieved by each unit 20 based on the model (the unit model) set for each unit 20. Specifically, the model controller 13 calculates a command value of each unit 20 based on the plant output (estimated behavior) estimated by the plant behavior estimator 11, the unit characteristic (the estimated characteristic) estimated by the characteristic estimator 10, and the model corrected by the characteristic estimator 10. Note that in a case where the units 20 include a unit 20 having a sub-unit, a command value corresponding to such a sub-unit may be calculated. The model controller 13 calculates at least the same number of command values as that of the units 20. The command values calculated by the model controller 13 are input to any one of the first feedback section 141 to the N-th feedback section 14N corresponding to the respective units 20.

The command value calculated by the model controller 13 corresponds to the target value of the unit characteristic of each unit 20. That is, in a case where the longitudinal acceleration of the automobile C is used as the estimated behavior, the model controller 13 calculates, e.g., a target value of the engine torque, and a target value of the motor torque. Such calculation is implemented in such a manner that the unit characteristic corresponding to the plant output to be achieved is calculated back based on the plant model and the unit model.

Particularly, the model controller 13 of the present embodiment can execute the model prediction control. In the case of such a configuration, input to the model controller 13 is discretized into a multi-level system. Specifically, the model controller 13 takes, as input, the unit characteristic, plant behavior, and model estimated or corrected at timing one step ahead of the current time, and the unit characteristic, plant behavior, and model estimated or corrected at timing two steps ahead of the current time, thereby correcting the target value of the unit characteristic of each unit 20 by using the target value generated by the plant behavior target generator 12 as the set value trajectory.

Here, as described above, in a case where the units 20 include the first unit 20₁ contributing to an increase or decrease in the predetermined plant output and the second unit 20₂ contributing to an increase or decrease in the plant output common to the first unit 20₁, the plant output as the plant behavior increases or decreases according to the additional value of the unit characteristics. For example, in a case where the engine torque and the motor torque are used as the unit characteristics, the plant output corresponding thereto can be described by a model taking, as input, the additional value of the engine torque and the motor torque, as described above. In this case, the model controller 13 can output a target value of the additional value of the engine torque and the motor torque.

Thus, for arithmetic operation for obtaining the target value of the engine torque and the target value of the motor torque, it is necessary to properly distribute the target value of the additional value to each unit 20. Thus, the model controller 13 of the present embodiment changes distribution of the plant output according to the unit performance determined by each characteristic estimator 10. Specifically, in a case where the characteristic estimator 10 determines that the performance of one of the first unit 20₁ or the second unit 20₂ has changed, the model controller 13 increases or decreases the target value of the other one of the first unit 20₁ or the second unit 20₂ to compensate for such a change. For example, in a case where the target value of the unit characteristic is corrected as a result of a change in the performance of the engine as the first unit 20₁ over time, it is assumed that an engine torque lower than a desired engine torque is output, and the target value of the motor torque of the motor as the second unit 20₂ is set high.

Figure 9:
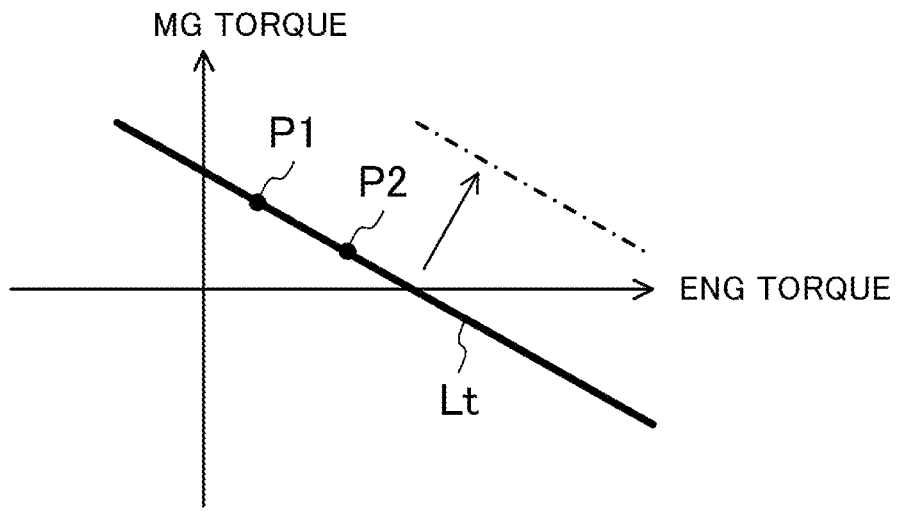
FIG. 9 is a graph for describing function distribution performed in control of the plant.

FIG. 9 is a graph for describing function distribution performed in control of the plant, particularly the automobile C. As shown in FIG. 9, the PCM 100 reads a map defined for distribution of the plant output. In FIG. 9, the sum of the engine torque (ENG TORQUE) and the motor torque (MG TORQUE) is constant on a line Lt. The line Lt shifts according to a drive state of the automobile C. In an example shown in FIG. 9, the line Lt shifts upward in a case where the automobile C accelerates or travels at a high speed, as indicated by a one-dot-chain line. Here, it is assumed that the motor torque and the engine torque are distributed as shown in a plot P2 at an initial point of time. Here, as described above, in a case where aging of the engine is determined, the model controller 13 changes distribution of torque from the plot P2 to a plot P1. Accordingly, the engine torque is set low while the motor torque is set high. For example, a map defined for current distribution may be stored with the map being associated with the drive environment (the drive conditions) of the automobile C. In this case, every time the automobile C is started, the PCM 100 can read a map suitable for current drive environment to use the map for distribution of the plant output.

The first feedback section $14_1$ to the N-th feedback section $14_N$ are provided so as to correspond to the respective units 20, and correct the target value of the unit characteristic calculated for each unit 20. Hereinafter, the "first feedback section $14_1$" to the "N-th feedback section $14_N$" may be collectively referred to as a "feedback section 14."

Specifically, the first feedback section $14_1$ to the N-th feedback section $14_N$ each correct the output signal of the model controller 13 based on an output signal from the unit 20 corresponding to each feedback section 14 to reduce a difference between the unit characteristic (hereinafter also referred to as an "actual characteristic") actually achieved by the unit 20 and the target value (hereinafter also referred to as a "target characteristic") input from the model controller 13. For performing such correction, the first feedback section 141 to the N-th feedback section $14_N$ each generate a feedback signal (equivalent to a FB characteristic amount in FIG. 5) corresponding to each unit 20.

As the feedback signal, a signal based on a difference or a ratio between the actual characteristic and the target characteristic can be used. For example, in a case where PID control based on the difference between the actual characteristic and the target characteristic is performed, the feedback signal is a signal obtained by addition of the product (the proportional term) of the difference and a proportional gain, the product (the integral term) of an integral value of the difference and an integral gain, and the product (the differential term) of a differential value of the difference and a differential gain. In a case where the difference between the actual characteristic and the target characteristic is used, the feedback section 14 adds the feedback signal calculated in the above-described manner and an electrical signal corresponding to the target characteristic, thereby correcting the target characteristic. The feedback section 14 is provided for each unit 20. Thus, such correction is executed in units of the unit 20.

Moreover, the feedback section 14 changes, based on the output signal from the corresponding unit 20, the FB characteristic amount indicating any one of the feedback signal or an FB parameter indicating a coefficient contributing to an increase or decrease in the feedback signal.

For example, in a case where PID-type feedback control is performed, the FB parameter is equivalent to the proportional gain, the integral gain, and the differential gain. The feedback section 14 adjusts the FB characteristic amount, thereby correcting the target characteristic and compensating for a change in the unit performance. For example, in a case where the actual characteristic of the corresponding unit 20 changes relatively greatly, the FB characteristic amount is greatly adjusted as compared to a case where the actual characteristic changes relatively slightly. Accordingly, feedback control that follows a change in the unit performance can be implemented.

More specifically, the feedback section 14 of the present embodiment adjusts the FB characteristic amount by data driven control. In this case, the unit characteristic achieved by the corresponding unit 20 is directly input to each feedback section 14 as in adaptive feedback control, or the unit characteristic is indirectly input to each feedback section 14 via a database as in so-called database type data driven control. Both types of control can be implemented by the feedback section 14.

Moreover, each feedback section 14 inputs the FB characteristic amount to the corresponding performance change determinator 10a. The performance change determinator 10a determines a change in the unit performance based on a change in the FB characteristic amount in each unit 20. For example, in a case where the FB feature greatly changes, it can be determined that there is a high possibility that the unit performance changes, as compared to a case where the FB characteristic amount slightly changes. Moreover, in a case where a change in the FB characteristic amount is not temporary, but is continuously made, it can be determined that there is a high possibility that the unit performance irreversibly changes. Thus, the performance change determinator 10a determines whether or not the moving average of the FB characteristic amounts exceeds a predetermined threshold, and counts the number of times that the moving average exceeds the predetermined threshold. The performance change determinator 10a determines whether or not the number of times counted in the above-described manner exceeds a predetermined number of times within a predetermined period, and if such determination is NO (or if the moving average is less than the predetermined threshold), adjusts the FB characteristic amount by, e.g., the data driven control, and corrects the target characteristic to compensate for a change in the unit performance.

On the other hand, if such determination is YES (or if the moving average is equal to or greater than the predetermined threshold), the performance change determinator 10a corrects, as described above, the unit model via the FF updater 10b, thereby correcting the target characteristic and therefore compensating for a change in the unit performance Here, the FF updater 10b updates the model by increasing or decreasing a parameter characterizing the unit model. Note that the FF updater 10b inputs, to the model controller 13, signals indicating that the model has been updated and indicating the updated parameter. The model controller 13 can change distribution of the plant output based on the signals input as described above.

The target characteristic corrected by the feedback section 14 is input to the corresponding unit 20 as the command value corresponding to the corresponding unit 20.

In the case of the present embodiment, the command value corrected by the first feedback section (the first FB section) $14_1$ is input to the first unit (the engine) $20_1$. The first unit $20_1$ outputs the engine torque as the actual characteristic of the engine based on dynamics $D_1$ corresponding to the unit performance at the time of inputting the command value. The signal indicating the engine torque is input to the first feedback section (the first FB section) $14_1$, and the first feedback section $14_1$ executes the feedback control based on the FB characteristic amount, correction of the unit model of the engine, for example.

Similarly, the command value corrected by the second feedback section (the second FB section) $14_2$ is input to the second unit (the motor) $20_2$. The second unit $20_2$ outputs, as the actual characteristic of the motor, the actually-achieved motor torque based on dynamics $D_2$ corresponding to the unit performance at the time of inputting the command value. The signal indicating the motor torque is input to the second feedback section (the second FB section) $14_2$, and the second feedback section $14_2$ executes the feedback control based on the FB characteristic amount, correction of the unit model of the motor, for example.

The automobile C as the plant outputs, for example, the longitudinal speed, the longitudinal acceleration as the plant output based on the engine torque output by the engine as the first unit $20_1$, the motor torque output by the motor as the second unit, and dynamics $D_p$ corresponding to the performance of the first and second units $20_1$, $20_2$ at the time of inputting the engine torque and the motor torque.

That is, the unit characteristic estimated by the first characteristic estimator $10_1$, the unit characteristic estimated by the second characteristic estimator $10_2$, and the plant output (the estimated behavior) estimated by the plant behavior estimator 11 respectively correspond to the unit characteristic achieved by the first unit $20_1$, the unit characteristic achieved by the second unit $20_2$, and the plant output (actual behavior) achieved by the automobile.

In a case where the performance unique to each unit 20 is kept constant and the model prediction control by the model controller 13 is performed with favorable accuracy, each unit characteristic and the plant output substantially match each other. The unit model described above is equivalent to the model of the dynamics $D_1$, $D_2$ of the corresponding unit 20, and the plant model is equivalent to the model of the dynamics $D_p$ of the entire plant. Thus, in a case where a performance change such as aging occurs in any of the units 20, it is possible to compensate for the performance change only by correction of the model corresponding to the unit 20 in which the performance change has occurred without the need for changing the plant model and therefore the unit models of all of the units 20.

Hereinafter, each functional block will be sequentially described in more detail.

<Detailed Configuration>

—Characteristic Estimator 10—

Figure 5:
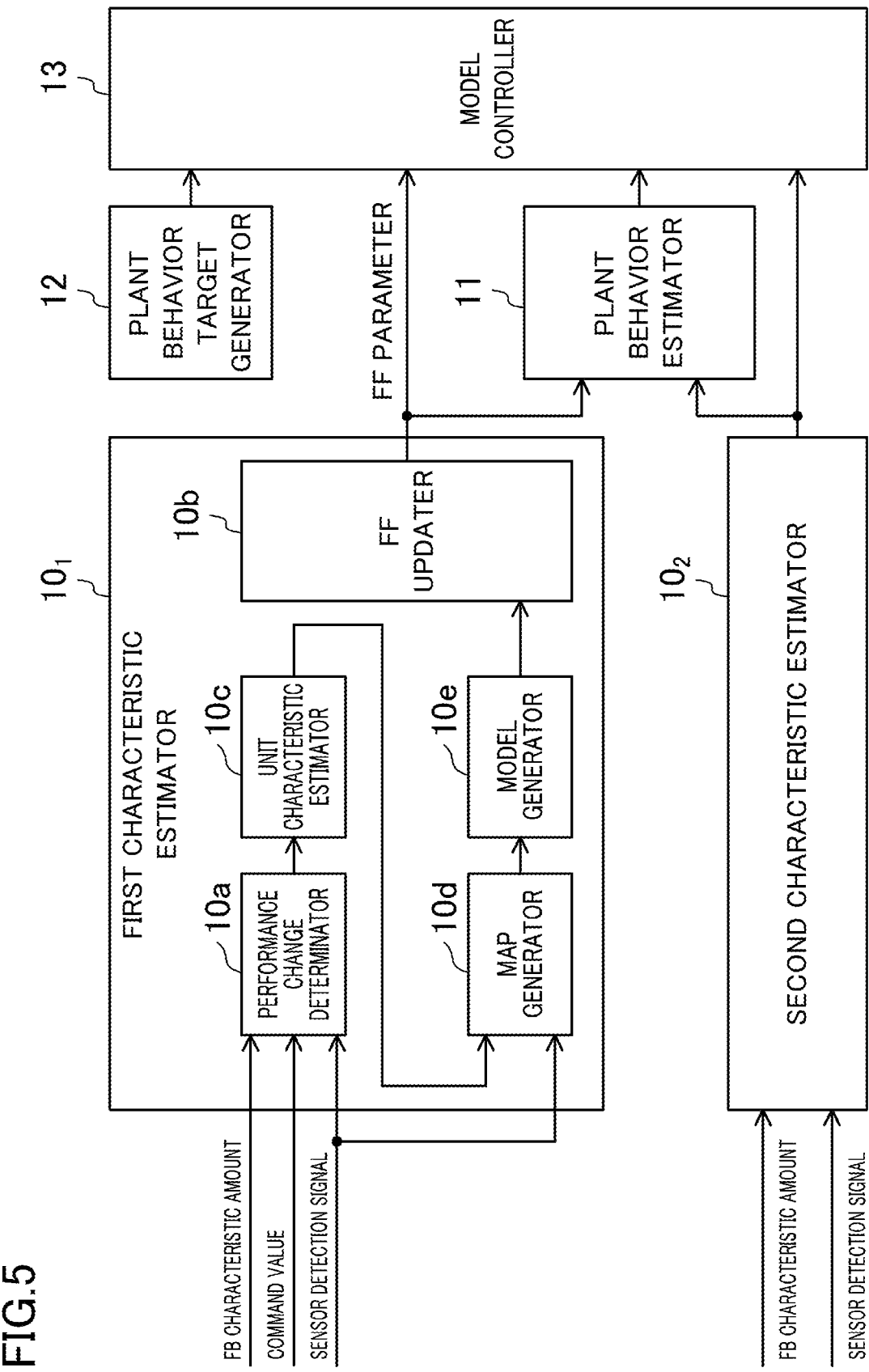
FIG. 5 is a diagram for describing estimation of a unit characteristic by a characteristic estimator.

FIG. 5 is a diagram for describing estimation of the unit characteristic by the characteristic estimator 10. As shown in FIG. 5, the characteristic estimator 10 includes a unit characteristic estimator 10c, a map generator 10d, and a model generator 10e in addition to the performance change determinator 10a and the FF updater 10b described above. In an illustrated example, only the first characteristic estimator $10_1$ is shown, but the same also applies to the configuration of the second characteristic estimator 102.

As described above, the performance change determinator 10a determines a change in the corresponding unit performance based on the multileveled command value and the FB characteristic amount. Here, the measurement signal of the external air temperature sensor SW1 as the external sensor is also input to the performance change determinator 10a. Thus, e.g., the air resistance may change according to an air density and therefore an external air temperature. As described above, although the air resistance may influence optimization of the unit performance and therefore the unit model, such influence is considered to be temporal influence. For this reason, it is not proper to consider influence caused due to the drive environment (external environment), which includes the air resistance, of the automobile C as a change in the unit performance over time.

Thus, the performance change determinator 10a determines a change in the unit performance based on the drive environment of the automobile C (the operation environment of the plant) detected by the external sensor such as the external air temperature sensor SW1 and the FB characteristic amount. For example, the PCM 100 or a secondary storage apparatus connected to the PCM 100 stores, for example, a database, a map, and a model in which the FB characteristic amount and the drive environment are associated with an index for determining a change in the unit performance. The performance change determinator 10a inputs the FB characteristic amount input from the feedback section 14 and the current drive environment to, e.g., the database, thereby determining whether the input FB characteristic amount indicates a temporal change in the unit performance or a continuous change (an irreversible change) in the unit performance.

Note that as information associated with the drive environment, an altitude, an atmospheric pressure, and other factors at a point where the automobile C is traveling can be used. Such information can be measured by a GPS sensor as an external sensor, for example. The PCM 100 can determine a change in the unit performance using the altitude, the air pressure, and other factors instead of or in addition to the external air temperature. Instead of or in addition to the measurement signal from the external sensor, a travel distance (an operation period of a plant in the case of a more general plant) of the automobile C may be recorded, and a change in the unit performance may be determined with reference to the recorded contents.

As in description of the schematic configuration of the characteristic estimator 10, the unit characteristic estimator 10c estimates which unit performance has changed among a plurality of unit performances set for each unit 20 and to what extent the unit performance has changed. Such estimation can be performed based on the amount of change in the FB characteristic amount (particularly, a difference between the moving average of the FB characteristic amount and the predetermined threshold) and the drive environment or driving state of the automobile C.

For example, in the case of the engine as the first unit $20_1$, the unit characteristic estimator 10c can estimate a change in the performance of the engine by associating a change in the opening degree of the throttle valve 201a as the sub-unit forming the engine with the amount of change in the FB characteristic amount directly or indirectly contributing to the engine torque. More specifically, the unit characteristic estimator 10c can estimate a change in the performance in detail by associating a control target of the sub-unit forming each unit 20 with a change in the FB characteristic amount over time. Note that the "FB characteristic amount" in this example refers to an FB characteristic amount contributing to the opening degree of the throttle valve 201a (more specifically, the FB characteristic amount of torque acting on the throttle valve 201a). Since an intake air amount of the engine and therefore the engine torque are determined according to the opening degree of the throttle valve 201a, the FB characteristic amount can be taken as the FB characteristic amount indirectly contributing to the engine torque.

For example, if the FB characteristic amount increases in a single uniform way regardless of the opening degree of the throttle valve 201a, it can be determined that reactive force acting on a valve body of the throttle valve 201a has changed. In this case, it can be determined that a change has occurred in the performance of a return spring forming the throttle valve 201a (e.g., settling of the return spring has occurred). Similarly, for example, when the opening speed of the throttle valve 201a is constant, the FB characteristic amount is also constant. On the other hand, when the opening speed increases or decreases, in a situation where the FB characteristic amount increases or decreases, it can be determined that a change has occurred in the inertia moment of the throttle valve 201a. In this case, it can be determined that a foreign matter has adhered to the valve body or that the shape of the valve body has changed. It is also possible to determine to what extent each change has progressed by determining a combination of a change in the reactive force and a change in the inertia moment.

Note that the determination result obtained by the unit characteristic estimator 10c can be displayed on the display apparatus 30 of the automobile C. Accordingly, the driver can grasp the current performance of the automobile C. Further, as described later, the determination result obtained by the unit characteristic estimator 10c can be, as knowledge obtained by the automobile C, shared with other automobiles C via the external server Cs or be transmitted to a factory, for example.

The map generator 10d stores a map in which the drive environment of the automobile C (the operation environment of the plant), the FB characteristic amount, and an FF parameter as a parameter characterizing the model are associated with each other. The FF parameter refers to parameters, such as the tire radius and the gear ratio, used in formulation of the unit model. Instead of the map, a simpler database may be used. The map generator 10d can update, during drive of the automobile C, a relationship among the drive environment of the automobile C, the FB characteristic amount, and the FF parameter in real time.

For example, as the unit performance changes, the FF parameter is updated in real time as described above. Accordingly, the unit model of the engine is corrected. Note that when the unit model of the engine is corrected, the PCM 100 can also change distribution of the plant output based on the unit characteristic corresponding to the unit model and the plant output, as described above. For example, a case is assumed, in which the maximum value of the engine torque as the unit characteristic has decreased as a result of clogging of an injector of the engine. In such a case, the desired plant output might not be achieved depending on the setting of the target torque. Such a possibility is particularly noticeable in a case where maximization of the plant output or maximization of the energy efficiency of the plant is required. In this case, as described with reference to FIG. 9, the PCM 100 achieves the desired plant output by compensating for a change in the maximum value of the engine torque with the motor torque. On the other hand, for example, in a case where the target torque is not so great and maximization of the energy efficiency is not required, compensation with the motor torque is not necessary, and therefore, a distribution change as described above is not necessary. As described above, the PCM 100 is configured to change distribution of the plant output according to the target setting of the plant output.

With the map generator 10d, various factors such as a change in the unit performance in the unit 20 different from the corresponding unit 20 can be reflected in the model control. A change in the performance of the corresponding unit 20 "alone" is reflected in the model control so that the plant performance can be more reliably exhibited according to a developer's intention. The function of the model-based control can be more reliably implemented in such a manner that the knowledge of each unit characteristic associated with degradation of each unit 20 and variations in the performance of each unit 20 is accumulated.

The model generator 10e generates a model corresponding to the map by regression performed for the map generated by the map generator 10d. The model generated by the model generator 10e is a model in which the drive environment of the automobile C (the operation environment of the plant), the FB characteristic amount, and the FF parameter corresponding to each unit performance are associated with each other. Note that both of the map generator 10d and the model generator 10e are not essential.

The FF updater 10b reflects the FF parameter newly obtained by collation of the map, the model, and other factors in the unit model, thereby updating the unit model. In a case where the FF parameter characterizing the unit model also influences the form of the plant model, the FF updater 10b outputs the updated FF parameter to the plant behavior estimator 11 and the model controller 13. With such output, the unit model and the plant model are updated.

—Feedback Section 14—

Figure 6:
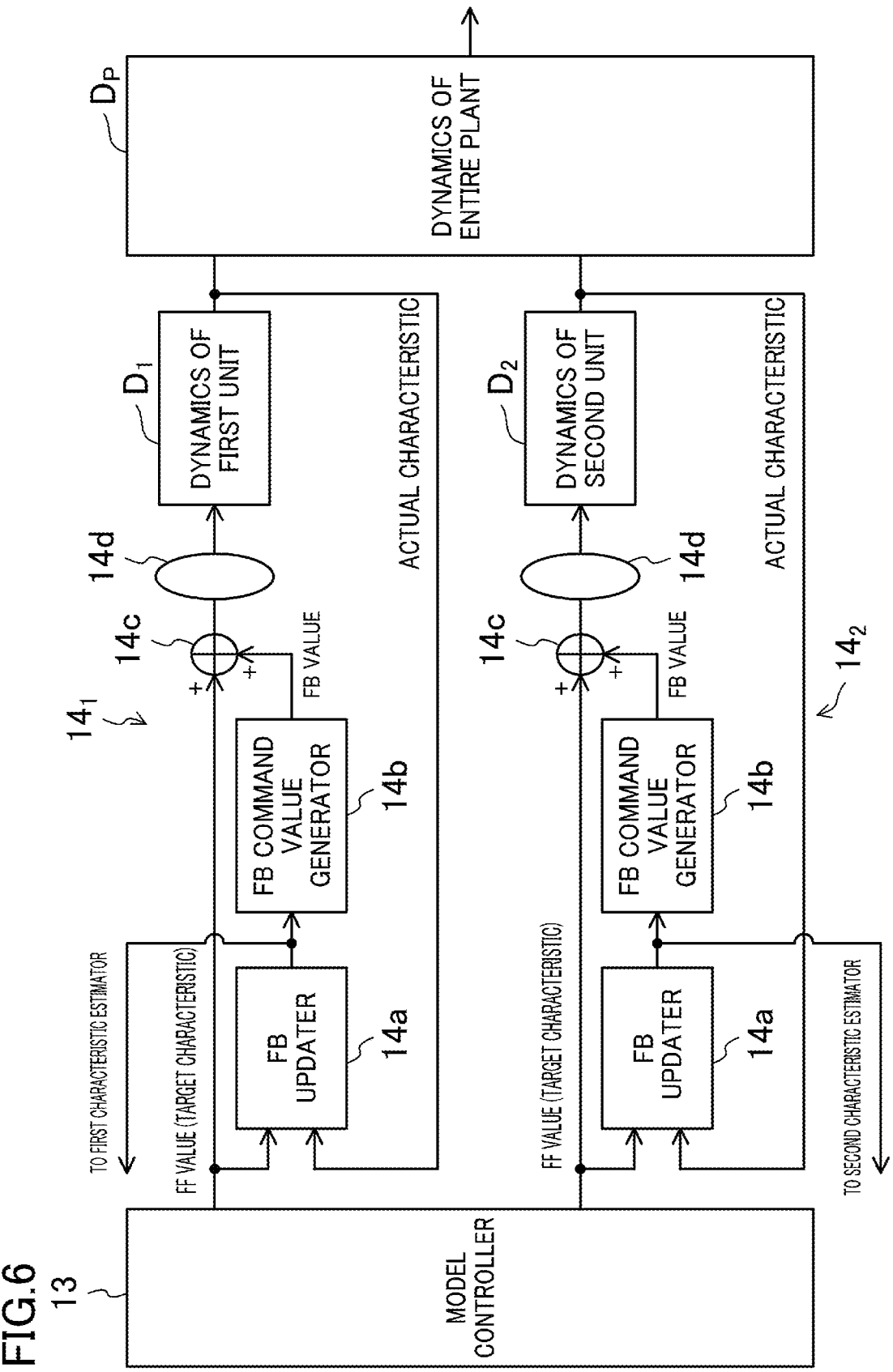
FIG. 6 is a diagram for describing unit characteristic feedback control by a feedback section.

FIG. 6 is a diagram for describing the unit characteristic feedback control by the feedback section 14. As shown in FIG. 6, the first feedback section $14_1$ as the feedback section 14 includes an FB updater 14a, an FB command value generator 14b, a target characteristic corrector 14c, and a timing adjuster 14d. As shown in the figure, the second feedback section 142 has a configuration similar to that of the first feedback section 141. Hereinafter, only the configuration of the first feedback section $14_1$ will be described, except for a configuration associated with cooperation between the feedback sections 14.

The FB updater 14a updates the FB parameter for increasing or decreasing the FB characteristic amount based on the difference or ratio between the target characteristic output from the model controller 13 and the actual characteristic in the first unit $20_1$. As described above, for example, in a case where the PID-type feedback control is performed, the FB parameter is equivalent to the proportional gain, the integral gain, and the differential gain. As a method of updating the FB parameter, a general method included in the data driven control can be used. For example, the FB parameter may be updated by the general adaptive control, or may be updated with reference to a database, a map, a model, and other factors.

Although not shown, the FB updater 14a of the present embodiment can update, in real time, the map and the model associated with each other such that one or more of the drive environment of the automobile C, the target characteristic, and the actual characteristic are taken as input and the FB parameter is taken as output, as in the map generator 10d and the model generator 10e in the characteristic estimator 10. The FB updater 14a can also derive, by machine learning, such a relational expression that one or more of the drive environment of the automobile C, the target characteristic, and the actual characteristic are taken as input and the FB parameter is taken as output, regardless of the form of the model set in advance. In this case, the FB updater 14a also functions as a regression learner.

The FB updater 14a inputs the updated FB parameter to the FB command value generator 14b. Further, in a case where the FB parameter is used as the FB characteristic amount, the FB parameter updated by the FB updater 14a is branched off from between the FB updater 14a and the FB command value generator 14b, and is input to the characteristic estimator (specifically, the first characteristic estimator $10_1$) 10 associated with the unit 20 common to the feedback section 14. Instead of directly inputting the FB parameter, the amount of change in the FB parameter may be input to the characteristic estimator 10.

The FB command value generator 14b generates a feedback signal indicating a correction value (an FB value) of the target characteristic based on the FB parameter updated by the FB updater 14a and the difference between the target characteristic and the actual characteristic.

As already described above, in a case where the PID-type feedback control is performed, the FB value is the sum of the proportional term, the integral term, and the differential term with the difference as an argument. However, the feedback section 14 of the present embodiment is not limited to such a value. For example, the signal indicating the FB value can be also generated based on the ratio between the target characteristic and the actual characteristic.

In a case where the FB value is used as the FB characteristic amount, the FB value calculated by the FB command value generator 14b is branched off from between the FB command value generator 14b and the target characteristic corrector 14c, and is input to the characteristic estimator (specifically, the first characteristic estimator 10i) 10 associated with the unit 20 common to the feedback section 14.

The target characteristic corrector 14c corrects the target characteristic based on the target characteristic (the FF value) output from the model controller 13 and the correction value (the FB value) generated by the FB command value generator 14b.

Here, in a case where the feedback section 14 performs the PID control based on the difference between the target characteristic and the actual characteristic, the target characteristic corrector 14c functions as an adder that outputs an electrical signal corresponding to the sum of the FF value and the FB value. On the other hand, in a case where the feedback control is performed based on the ratio between the target characteristic and the actual characteristic, the target characteristic corrector 14c functions as a multiplier that outputs an electrical signal corresponding to the product of the FF value and the FB value. In an illustrated example, only the former configuration is shown, but the present disclosure also includes the latter configuration.

In a case where there are one or more units specified by the unit specifier, i.e., one or more units 20 whose performance is determined to have changed by the performance change determinator 10a among the units 20, the timing adjuster 14d sets the timing of reflecting correction of the target characteristic to the substantially same timing among the units 20. More specifically, the timing adjuster 14d sets the timing as described above for the unit 20 contributing to an increase or decrease in the plant output that is common among the units 20. The combination of the units 20 as described above includes the combination of the steering unit and the brake unit in addition to the combination of the motor, the engine, and the brake unit as shown in the figure.

In a case where the unit specifier specifies a plurality of units, the target value corrector sets the timing of reflecting correction of the target value to the substantially same timing among the units.

<Example of Control>

Hereinafter, a main part of the control implemented by the control apparatus configured as described above will be described. In an example described below, the control apparatus is equivalent to the PCM 100 mounted on the automobile C as the plant, and the units 20 controlled by the PCM 100 are equivalent to the first unit $20_1$ including the engine and the second unit $20_2$ including the motor, as described above.

Figure 7:
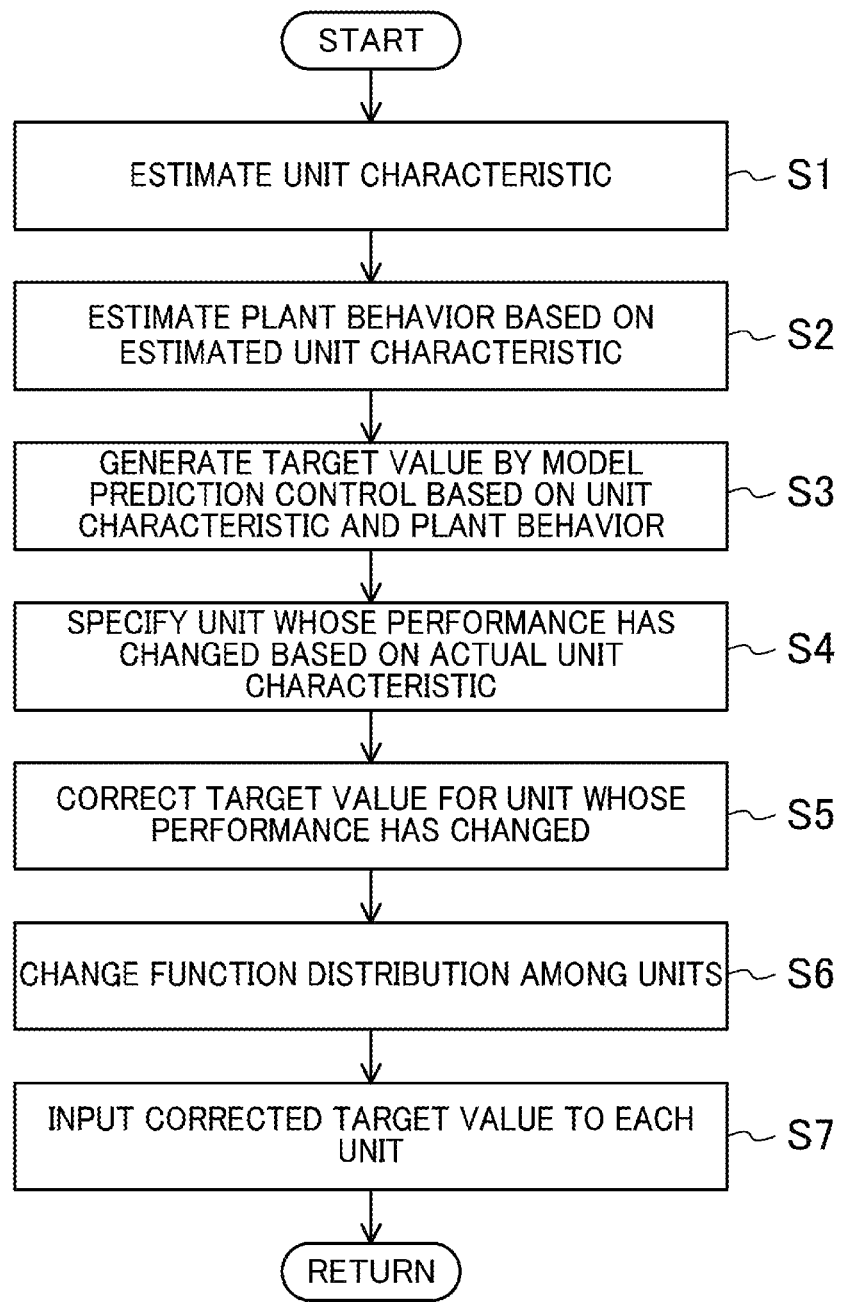
FIG. 7 is a flowchart showing, as an example, a main part of the control performed by the control apparatus.
Figure 8:
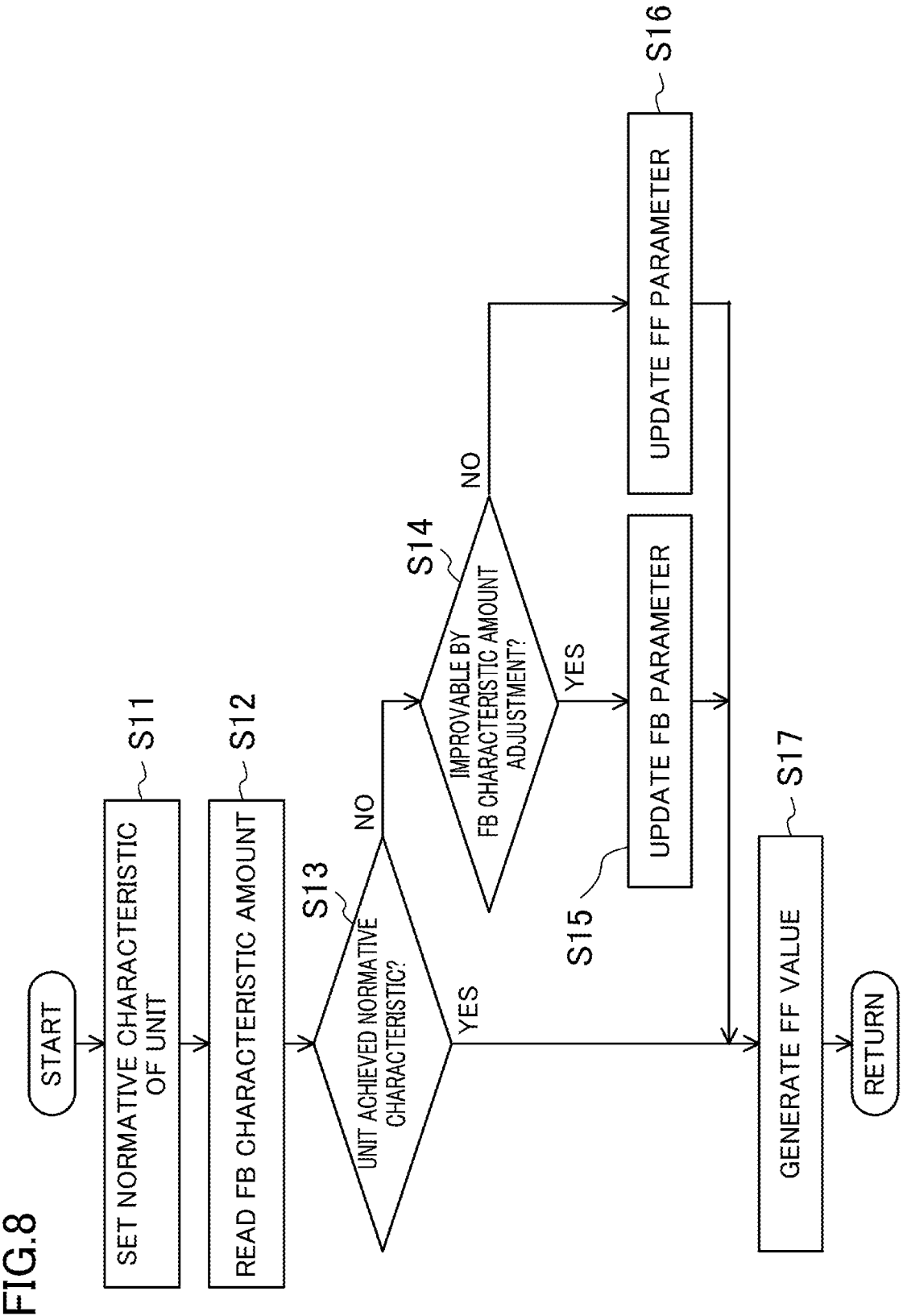
FIG. 8 is a flowchart showing, as an example, a main part of the procedure of correcting a target value.

FIG. 7 is a flowchart showing, as an example, the main part of the control performed by the control apparatus (the PCM 100). Moreover, FIG. 8 is a flowchart showing, as an example, a main part of the procedure of correcting the target characteristic. The flows shown in FIGS. 7 and 8 are repeatedly executed while the automobile C is being driven.

First, as shown in Step S1 of FIG. 7, the characteristic estimator 10 estimates the unit characteristic. The unit characteristic are estimated for each unit 20. Subsequently, in Step S2, the plant behavior estimator 11 estimates the plant behavior (the plant output) based on the estimated unit characteristic. Note that in a case where the model controller 13 performs the model prediction control, estimation of the unit characteristic and estimation of the plant behavior are performed for each multileveled time point.

Then, in Step S3, the model controller 13 generates, for example, the target value (the target characteristic) by the model prediction control based on the estimated unit characteristic and plant behavior. The target value is generated for each unit 20.

In Step S4, before, after, or in parallel with generation of the target value in Step S3, the performance change determinator 10a in the characteristic estimator 10 specifies the unit 20 whose performance has changed among the units 20 forming the automobile C as the plant based on the actual unit characteristic (the actual characteristic). Note that the order of the steps in FIG. 7 is merely an example. For example, Step S4 may be executed in advance of Step S1.

In Step S5, the FF updater 10b in the characteristic estimator 10 corrects the model associated with the unit specified in Step S4. The target characteristic is corrected through correction of the model by the FF updater 10b.

In Step S6, function distribution among the units 20 is changed as described with reference to FIG. 9. Specifically, the model controller 13 adjusts the ratio between the target characteristic of the engine as the first unit $20_1$ and the target characteristic of the motor as the second unit $20_2$ such that the behavior (the plant output) to be achieved by the automobile C is constant. Such processing can be performed based on the parameter characterizing the drive state of the automobile C, such as the measurement signal of the vehicle speed sensor SW2.

In Step S7, the corrected target characteristic is input to the unit 20. Each unit 20 achieves such a characteristic that the correction result of the target characteristic is reflected in the unit characteristic estimated in Step S1, and in response to such a corrected characteristic, the automobile C achieves the plant behavior (the actual behavior) similar to the plant behavior estimated in Step S2.

Here, the specific procedure of adjusting the target characteristic is as shown in FIG. 8. First, as shown in Step S11, the characteristic estimator 10 sets a normative characteristic of the unit 20 based on, e.g., the current drive environment. Subsequently, as shown in Step S12, the characteristic estimator 10 reads the FB characteristic amount calculated by the feedback section 14.

Figure 10:
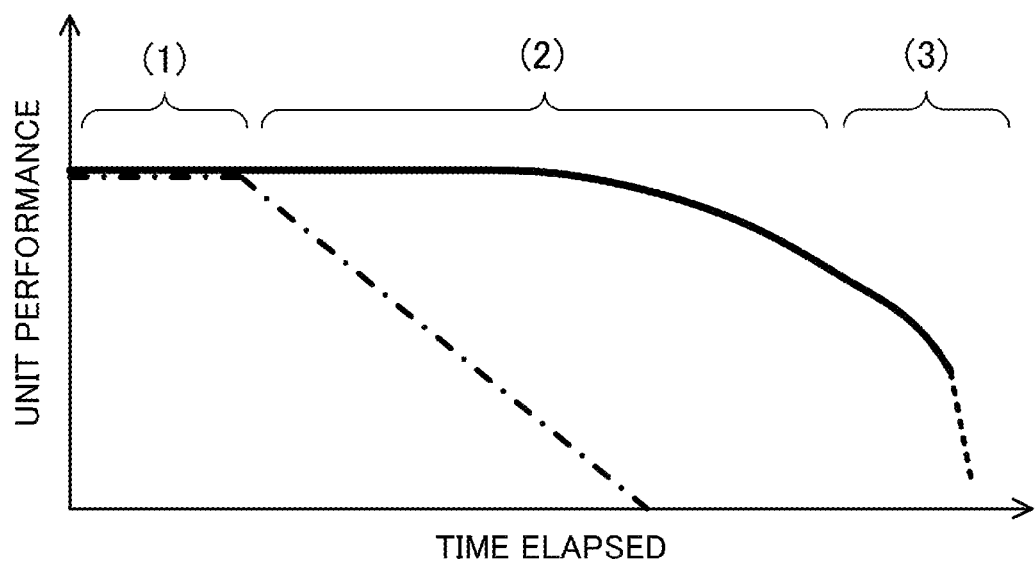
FIG. 10 is a graph for describing a change in unit performance over time.

Then, in subsequent Step S13, the characteristic estimator 10 determines, based on the characteristic of the unit 20 estimated based on the current FB characteristic amount, whether or not the characteristic estimated by the characteristic estimator 10 is the normative characteristic. If such determination is YES, the characteristic estimator 10 determines that the current system behavior is proper, and the model controller 13 generates the FF value and the processing returns. In this case, the PCM 100 executes the model prediction control in a state in which the FB parameter is fixed and the model corresponding to each unit 20 is not changed. As shown in (1) of FIG. 10, this state corresponds to a state in which the unit 20 does not change over time and the unit performance thereof is maintained constant or a state in which a change has occurred over time and is compensated for by updating of the FF parameter or the FB parameter (a state in which the normative characteristic reflecting the updated FF parameter or FB parameter is achieved).

On the other hand, is the determination in Step S13 is NO, the characteristic estimator 10 determines, in Step S14, whether or not a response characteristic of the unit 20 can be improved (whether or not improvement can be made by FB characteristic amount adjustment?). If such determination is YES, the feedback section 14 corresponding to the unit 20 updates the FB parameter as shown in Step S15, and the model controller 13 generates the FF value and the processing returns. In this case, the PCM 100 executes the model prediction control in a state in which the FB parameter is fixed and the model corresponding to each unit 20 is not changed. As indicated by a solid line in (2) of FIG. 10, this state corresponds to a state in which the unit performance has been degraded due to a change in the unit 20 over time, but influence of such degradation is compensated for by updating of the FB parameter. Note that a chain line in FIG. 10 corresponds to a performance curve in a case where neither the FB parameter nor the FF parameter is updated.

If the determination in Step S14 is NO, the characteristic estimator 10 determines that the unit performance of the unit 20 has irreversibly greatly changed. In this case, the characteristic estimator 10 updates the FF parameter, the model controller 13 generates the FF value, and the processing returns. In this case, as shown in Step S16, the PCM 100 executes the model prediction control in a state in which the FB parameter has been changed and the FF parameter characterizing the model corresponding to each unit 20 has been changed. As shown in (3) of FIG. 10, this state corresponds to a state in which the unit performance has been greatly degraded due to a change in the unit 20 over time, but influence of such degradation is compensated for by updating of the FB parameter and a model change (updating of the FF parameter).

As described above, according to the present embodiment, the FF updater 10b performs correction of the characteristic target for the unit 20 specified by the performance change determinator 10a, i.e., the unit 20 determined that the performance unique to the unit has changed, among the units 20. Accordingly, the performance of the automobile C is autonomously compensated and can be kept constant. Moreover, by performing compensation for each unit 20 instead of performing compensation for each automobile C, performance compensation can be achieved while a change in the control forms of other units 20 is reduced as much as possible.

In addition, the FF updater 10b achieves the desired plant output by correcting the target characteristic through correction of the model corresponding to the specified unit 20. In this manner, by adjusting the plant output through compensation for each unit 20, adjustment of the plant output can be achieved while a change in the control forms of other units 20 is reduced.

Further, as described with reference to FIG. 9, in a case where the performance of the first unit $20_1$ has, for example, irreversibly greatly changed, the desired plant output can be achieved by an increase or decrease in the target value of the second unit $20_2$. In this manner, other units 20 autonomously recover a change in the performance, which is advantageous in keeping the performance of the automobile C constant.

For a change with a relatively-small change amount in a temporal performance change or an irreversible performance change, the characteristic target is corrected by the feedback control. On the other hand, for a change with a relatively-great change amount in the irreversible performance change, the characteristic target is corrected through correction of the model. In this manner, by selectively using these two correction methods, more flexible control is achieved, which is advantageous in keeping the performance of the automobile C constant.

Moreover, by using the external sensor such as the external air temperature sensor SW1, such control that a change in the performance of the unit 20 is associated with the operation environment of the automobile C can be achieved. Accordingly, the performance of each unit 20 can be more properly compensated.

Other Embodiments (Other Units 20)

In the above-described embodiment, the control associated with the combination of the engine as the first unit $20_1$ and the motor as the second unit $20_2$ has been described. However, the present disclosure is not limited to such control. The present disclosure is also applicable to control associated with the combination of the brake unit with the engine and the motor. Similarly, the present disclosure is also applicable to control associated with the combination of the steering unit and the brake unit instead of the engine and the motor.

(Cooperation with External Server Cs)

In the above-described embodiment, the configuration has been described, in which the PCM 100 of each automobile C forming the control system S functions as the control apparatus of the present disclosure, but the present disclosure is not limited to such a configuration. At least some of the functional blocks functioning as the control apparatus may be mounted on the external server Cs, and the automobiles C may communicate with each other via the external server Cs. In this case, a calculation system with the combination of the PCM 100 and the external server Cs functions as the control apparatus of the present disclosure.

Figure 11:
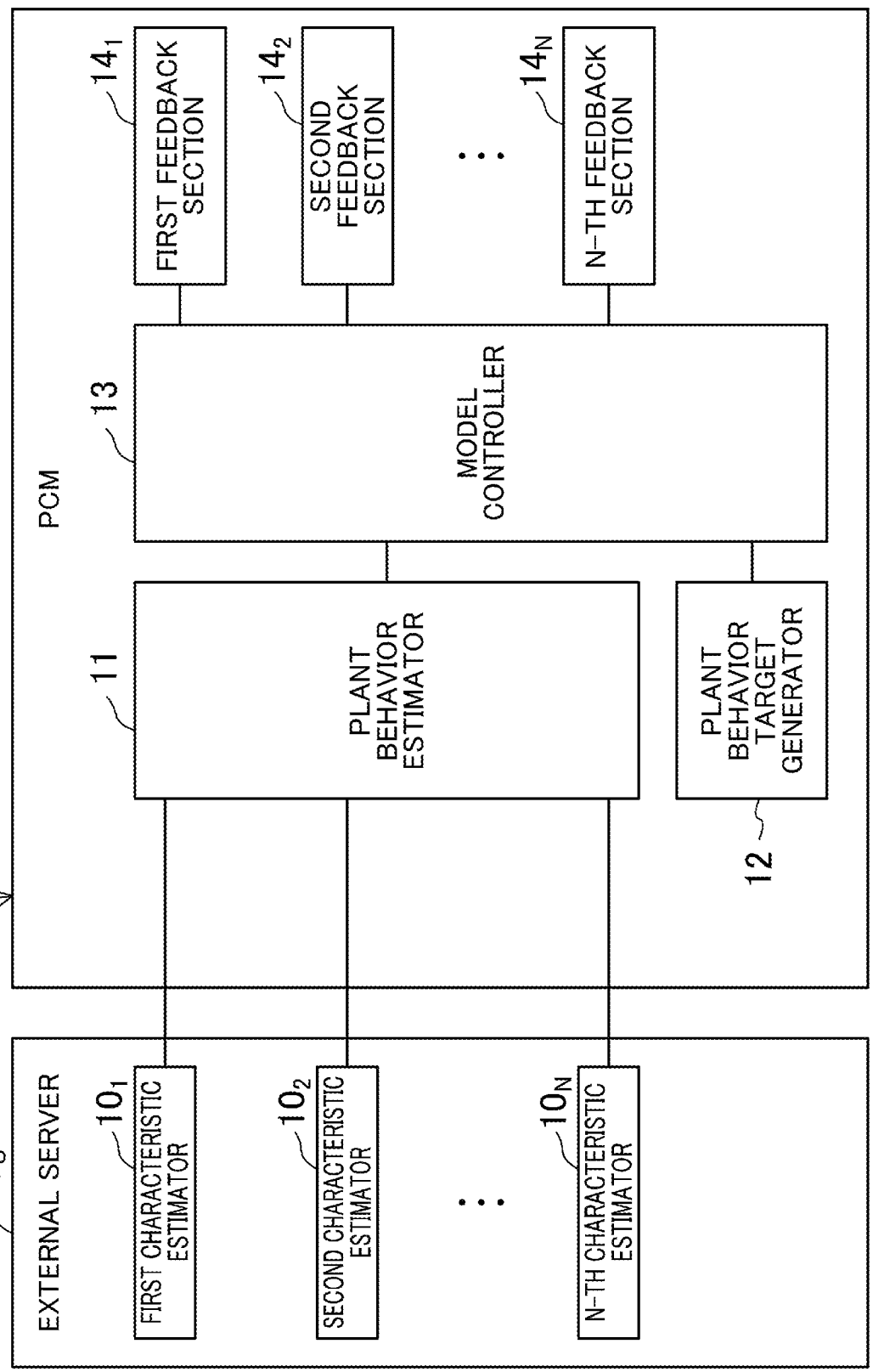
FIG. 11 is a diagram for describing cooperation with an external server.

In this case, as in a PCM 100' shown in FIG. 11, the first characteristic estimator $10_1$ to the N-th characteristic estimator $10_N$ can be mounted on the external server Cs. The configuration is not limited to the illustrated example, and some of the first characteristic estimator $10_1$ to the N-th characteristic estimator $10_N$ may be mounted on the PCM 100' and the other estimators may be mounted on the external server Cs, or a functional block other than the first characteristic estimator $10_1$ to the N-th characteristic estimator $10_N$, such as the plant behavior estimator 11, may be mounted on the external server Cs.

Figure 12:
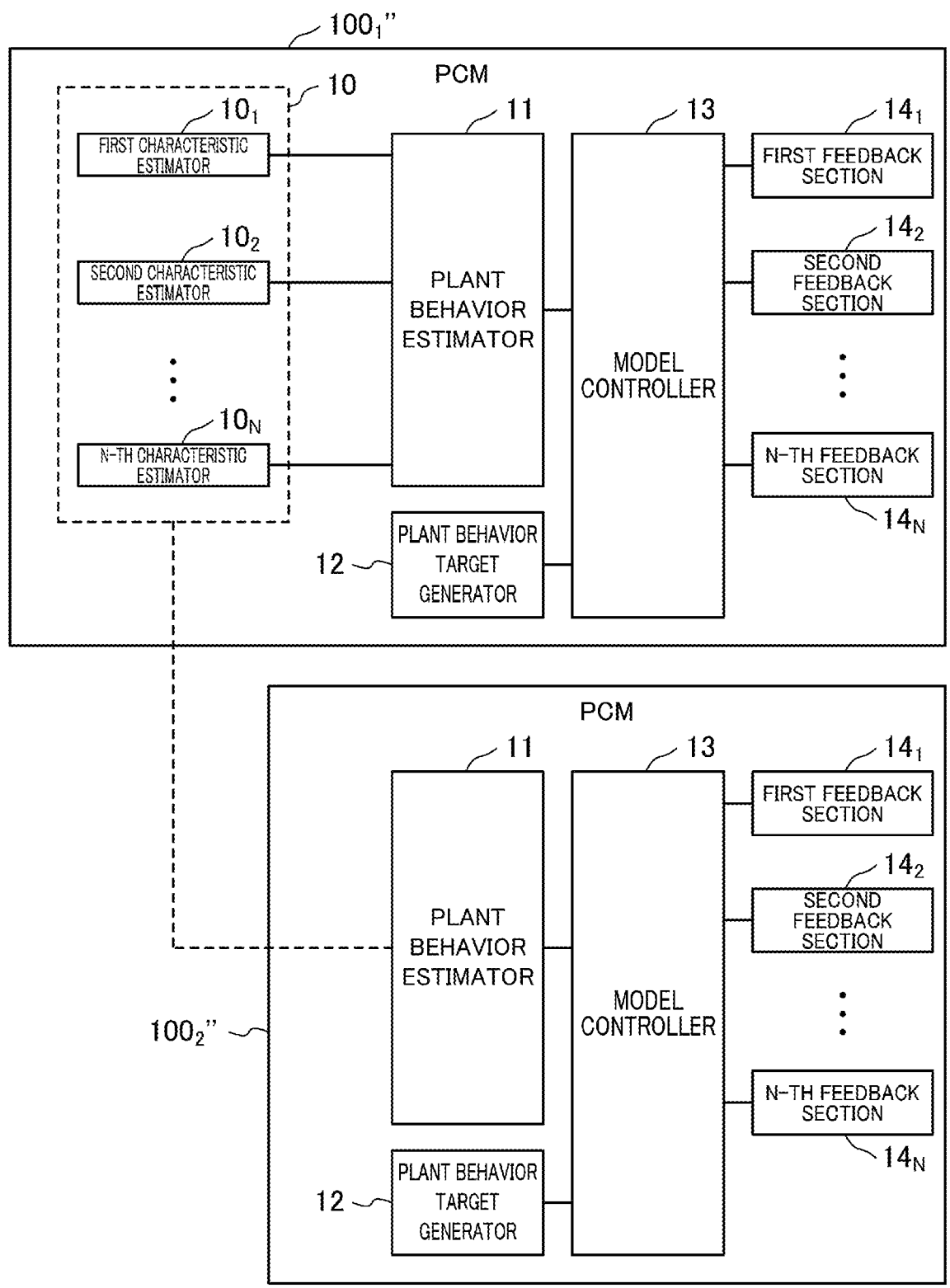
FIG. 12 is a diagram for describing cooperation among the plants in the control system.

(Cooperation Between Plants) Instead of the configuration shown in FIG. 11, a configuration may be employed, in which the specifying result of the unit specifier (the characteristic estimator 10) in any one of the plants is shared among the other plants. In this case, as shown in FIG. 12, the characteristic estimator 10 is mounted only on a predetermined PCM $100_1$", and the other PCM $100_2$" performs, e.g., correction of the target characteristic in response to a specifying result obtained by the PCM $100_1$". In this case, cooperation via the external server Cs is not essential.

The configuration is limited to the illustrated example, and in a state in which the characteristic estimator 10 is also mounted on the PCM $100_2$", information on, e.g., the unit whose performance has changed is mutually exchanged between the plants. For example, a database, a map, a model, and other factors generated based on the external air temperature can be shared among the automobiles C.

(Cooperation with Factories F1, F2)

Figure 13:
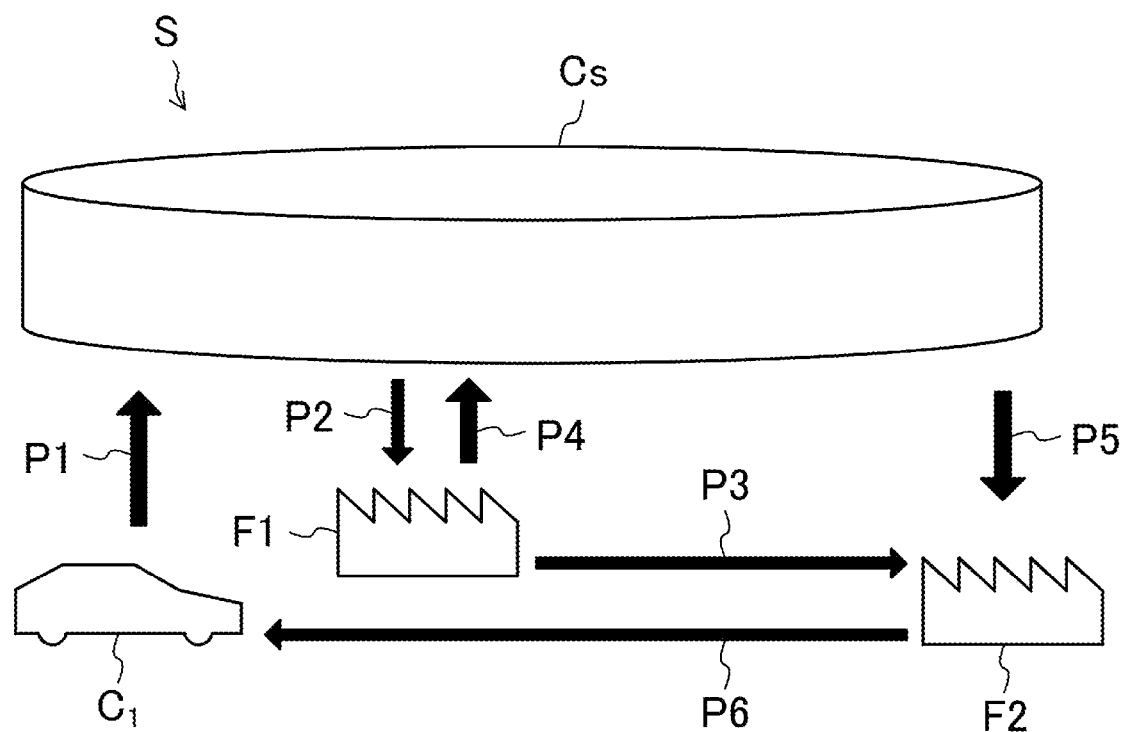
FIG. 13 is a diagram for describing cooperation among the plant and factories.

For example, as shown in FIG. 13, instead of or in addition to cooperation of the automobiles C with each other via the external server Cs, the automobile C, the component factory F1 for the automobile C, and the system repair factory F2 for the automobile C can cooperate with each other.

In this case, as shown in a process P1, when information indicating the knowledge obtained by the automobile C (more specifically, information indicating a change in the unit performance of each unit 20 over time) is transmitted to the external server Cs, the external server Cs orders the component factory F1 to manufacture the unit 20 or orders the component factory F1 to manufacture the sub-units forming each unit 20, such as the throttle valve 201a and the EGR valve 201b, based on a change in the unit performance over time (see a process P2).

Thereafter, as shown in a process P3 and a process P4, components such as the sub-units are delivered from the component factory F1 to the system repair factory F2, and the delivery of the components is notified from the component factory F1 to the external server Cs. Thereafter, the external server Cs reserves maintenance work in the system repair factory F2 (see a process P5). Finally, the system repair factory F2 or the external server Cs notifies the automobile C of the contents of the reservation (see a process P6).

As described above, the control apparatus of the present disclosure performs the control based on a change in the unit performance, and becomes extremely useful by outputting the information indicating such a change to the outside of the plant or sharing such information among the plants.

What is claimed is:

1. A control apparatus for controlling a plant including a plurality of units, the control apparatus comprising:
    a model controller that generates a target value of a characteristic to be achieved by each unit based on a model set for each unit;
    a unit specifier that specifies a unit in which performance unique to the unit has changed among the units;
    a target value corrector that corrects the target value for the unit that has been specified by the unit specifier, and
    a plurality of feedback sections that corresponds to the respective units, wherein
    the plant is an automobile,
    the units include an engine that outputs torque for driving the automobile and a motor that outputs torque for driving the automobile,
    the target value corrector corrects the target value for the unit that has been specified by the unit specifier to keep a performance of the automobile constant,
    each feedback section generates, based on an output signal from the unit corresponding to the each feedback section, a feedback signal for correcting an output signal from the model controller to compensate for a difference between a characteristic actually achieved by the unit and the target value,
    each feedback section corrects the output signal by adjusting an FB characteristic amount indicating any one of the feedback signal or an FB parameter indicating a coefficient contributing to an increase or decrease in the feedback signal based on the output signal from the unit,
    each feedback section inputs the FB characteristic amount to the unit specifier,
    based on a change in the FB characteristic amount in each unit, the unit specifier determines a change in the performance unique to the unit,
    the target value corrector, based on a change in the FB characteristic amount in each unit,
        corrects the target value through adjustment of the FB characteristic amount in a case where a moving average of the FB characteristic amount is less than a predetermined threshold, and
        corrects the target value through correction of the model corresponding to the unit that has been specified by the unit specifier in a case where the moving average of the FB characteristic amount is equal to or greater than the predetermined threshold,
    generation of the target value by the model controller, specifying of the unit by the unit specifier, and correction of the target value by the target value corrector are repeatedly executed while the automobile is being driven,
    the target value is a command value corresponding to each of the plurality of units, and
    the control apparatus inputs the command value to the engine and the motor.

2. The control apparatus of claim 1, further comprising:
    a plurality of characteristic estimators that corresponds to the respective units and estimates the characteristic achieved by each unit; and
    a plant behavior estimator that estimates plant output of the plant based on the characteristic that has been estimated by each characteristic estimator, wherein
    the target value corrector corrects the target value such that desired plant output is achieved.

3. The control apparatus of claim 2, wherein
    the units include a first unit contributing to an increase or decrease in predetermined plant output and a second unit contributing to an increase or decrease in the plant output common to the first unit, and
    in a case where the unit specifier determines that performance of one of the first unit or the second unit has changed, the model controller increases or decreases the target value associated with the other one of the first unit or the second unit to compensate for the change.

4. The control apparatus of claim 1, further comprising a measurer that detects a measurement signal indicating operation environment of the plant, wherein
    the unit specifier determines a change in the performance unique to the unit based on the measurement signal of the measurer and the FB characteristic amount.

5. The control apparatus of claim 4, further comprising a map generator that stores the operation environment of the plant, the FB characteristic amount, and an FF parameter as a parameter characterizing the model in association with each other, wherein
    the target value corrector collates the FF parameter corresponding to the FB characteristic amount based on the signal detected by the measurer and the FB characteristic amount.

6. The control apparatus of claim 5, wherein
    the map generator updates, during drive of the plant, a relationship among the drive environment of the plant, the FB characteristic amount, and the FF parameter in real time.

7. The control apparatus of claim 6, wherein
    in a case where the unit specifier specifies a plurality of units, a timing of reflecting correction of the target value is adjusted to substantially identical timing among the units.

8. The control apparatus of claim 7, wherein
    the units include one or more of an engine and a motor that output torque for driving the automobile, a brake unit that puts a brake on the automobile, or a steering system that steers the automobile.

9. A control system comprising a plurality of plants controlled by the respective control apparatuses of claim 8, each plant including the units,
    a specifying result of the unit specifier in any one of the plants being shared among other plants.

10. The control system of claim 9, wherein
    at least some of the control apparatuses are mounted on an external server, and
    the plants communicate with each other via the external server.

* * * * *